March 27, 1962 A. L. JOHNSON 3,027,508

INVERTER HAVING AMPLITUDE REGULATION

Filed Sept. 25, 1959 3 Sheets-Sheet 1

INVENTOR
ANDREW L. JOHNSON

Flehr & Swain
ATTORNEYS

INVENTOR
ANDREW L. JOHNSON

Flehr & Swain
ATTORNEYS

March 27, 1962 A. L. JOHNSON 3,027,508

INVERTER HAVING AMPLITUDE REGULATION

Filed Sept. 25, 1959 3 Sheets-Sheet 3

*INVENTOR.*
ANDREW L. JOHNSON

Flehr & Swain
ATTORNEYS

United States Patent Office 3,027,508
Patented Mar. 27, 1962

3,027,508

INVERTER HAVING AMPLITUDE REGULATION

Andrew L. Johnson, Mountain View, Calif., assignor to Ampex Corporation, Redwood City, Calif., a corporation of California Filed Sept. 25, 1959, Ser. No. 842,449
9 Claims. (Cl. 321—19)

This invention relates to D.-C. to A.-C. inverters and in particular to such inverters having amplitude regulation.

In many electronic devices there is a need for an A.-C. voltage source which is not only regulated as to frequency but also as to amplitude. For example, a device requiring such regulated amplitude and frequency is a motor drive circuit in a tape transport system. In certain instances, only a D.-C. source is available and an inverter is required to supply the necessary A.-C. power to the motor drive circuit. In inversion systems of the prior art, the frequency can be regulated by synchronizing pulses. However, amplitude variations in the signal cause erratic motor operation.

It is an object of this invention to provide an improved inverter wherein the amplitude of the A.-C. voltage as well as its frequency is regulated.

It is another object of this invention to provide an inverter supplied with a D.-C. voltage and synchronizing pulses having constant frequency and amplitude output.

It is another object of this invention to provide an A.-C. motor drive system powered by a source of D.-C. voltage and sync pulses.

The above mentioned objects and others will become more clearly apparent upon reading the following specification along with the drawings in which.

Figure 1:
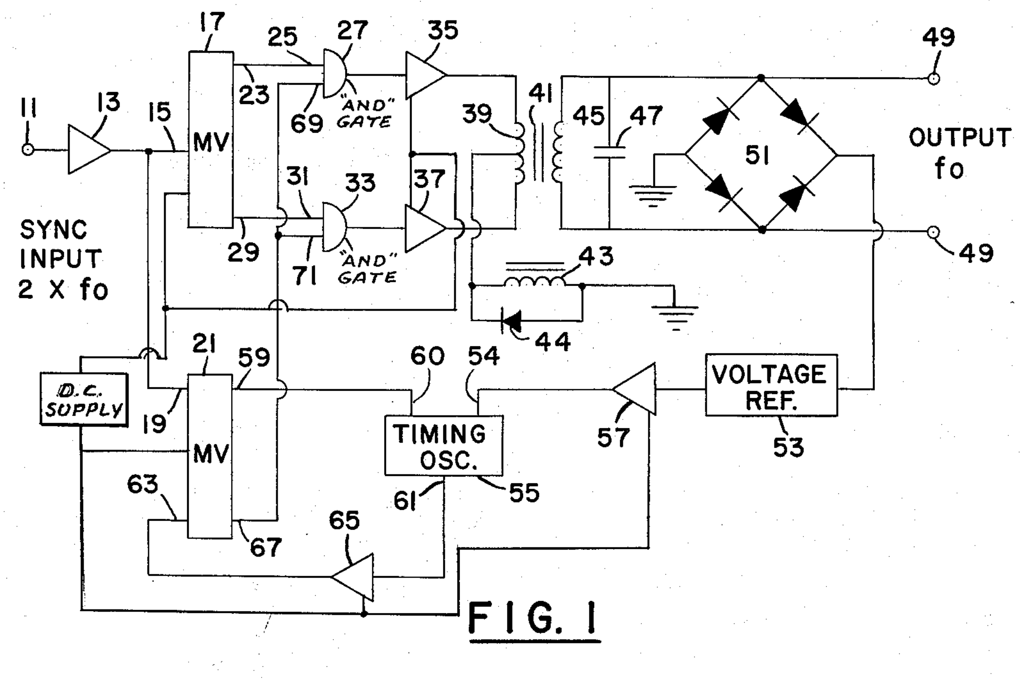
FIGURE 1 is a block and schematic diagram of one embodiment of the inverter of this invention.

As shown in FIGURE 1, sync input terminal 11 is connected to a sync amplifier 13. The output of the sync amplifier 13 is connected to input 15 of a bistable device, such as a multivibrator 17 and to input 19 of a bistable device such as multivibrator 21. The output 23 of multivibrator 17 is connected to the coincidence or AND gate input 25 of the AND gate 27. The output 29 of the multivibrator 17 is connected to the input 31 of the AND gate 33. The outputs of AND gates 27 and 33 are connected to amplifiers 35 and 37 respectively. The output of the amplifiers 35 and 37 are connected across the split primary winding 39 of the output transformer 41. The center tap of the primary winding 39 is returned to ground through the inductor 43 and diode 44 in parallel.

The secondary winding 45 of the output transformer 41 is connected across the capacitor 47 and to the output terminals 49. The bridge rectifier 51 is connected across the output terminals 49. One of the D.-C. terminals of the rectifier 51 is returned to ground while the other D.-C. terminal is connected to a voltage reference device 53. The voltage reference device 53 is connected through amplifier 57 to the input 54 of a pulse generator or a timing oscillator 55 which may be a unijunction transistor oscillator for example. The output 59 of the multivibrator 21 is connected to another input 60 of the timing oscillator 55. The output 61 of the timing oscillator 55 is connected to the input 63 of the multivibrator 21 through an amplifier 65. The output 67 of the multivibrator 21 is connected to the inputs 69 and 71 of the coincidence gates 27 and 33 respectively.

Figure 2:
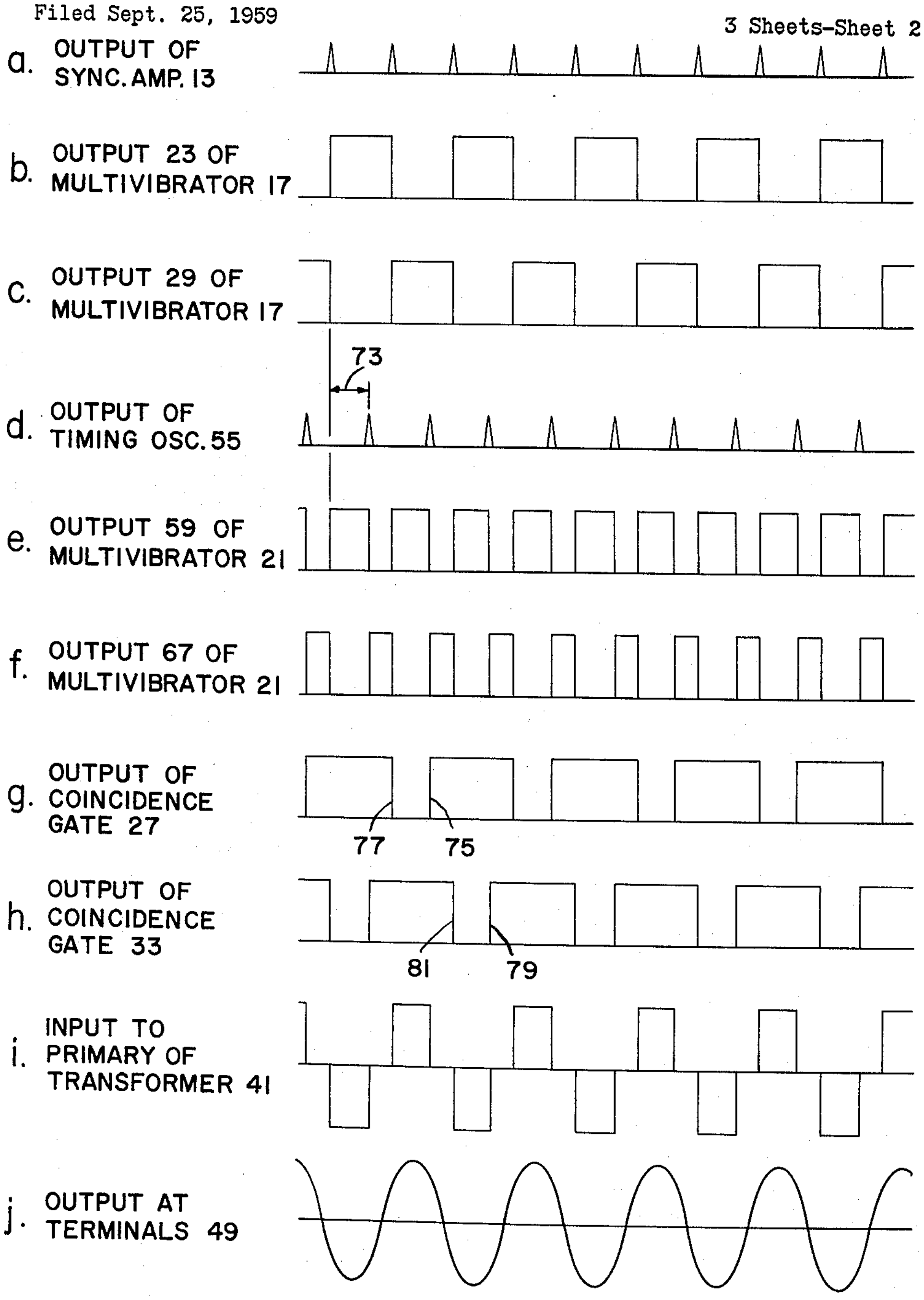
FIGURE 2 is a time diagram of various voltages in the circuit.

The operation of the system can be seen more clearly in conjunction with the time diagrams shown in FIGURE 2. A sync input which is at twice the output frequency is differentiated and amplified in the sync amplifier 13 and applied to the multivibrator inputs 15 and 19. The application of a pulse to the multivibrator 17 produces a pulse at outputs 23 and 29 as shown in FIGURES 2*b* and 2*c*. These pulses are in turn applied to the inputs 25 and 31 of the AND gates 27 and 33. The application of the amplified sync pulses to the multivibrator 21 cause the output 59 to go positive as shown in FIGURE 2*e*. These positive pulses are applied as an input to the timing oscillator 55. Simultaneously, the output 67 of the multivibrator 21 returns to ground potential as shown in FIGURE 2*f*. The output 67 applies a negative going pulse to the AND gates 27 and 33 at inputs 69 and 71, along with the negative going pulse from either the multivibrator output 23 or 29. The AND gate 27 or 33 respectively returns to ground. The ground potential of the AND gate 27 or 33 causes the respective amplifier 35 or 37 to conduct and current to pass through the upper or lower half of primary 39 of transformer 41.

The timing oscillator 55 has a period approximately two-thirds as long as that of an output frequency half cycle. Consequently, after two-thirds of the half cycle of the output is expired, the timing oscillator 55 will produce a pulse at its output 61 which is amplified and applied to the input 63 of the multivibrator 21. The pulse at the input 63 causes the multivibrator 21 to be reset, thereby providing a positive pulse at the output 67 and a negative going pulse at the output 59. The negative going pulse at the output 59 stops the operation of the timing oscillator 55, while the positive pulse on the output 67 causes the AND gate 33 to close. Upon a subsequent sync input pulse, the multivibrator 17 is set in the opposite sense and the system repeats itself utilizing the AND gate 27, rather than the gate 33. Consequently, a current is passed through the upper portion of the primary 39 of the output transformer 41, causing an overall current in the transformer to be in an opposite direction than in the cycle described above. The input to the primary of the transformer 41 is shown in FIGURE 2*i*, and the output across the secondary of the transformer 41 is shown in FIGURE 2*j*, wherein due to the inductor 43 and the capacitor 47 a sinusoidal wave is produced. The diode 44 serves to protect the amplifiers 35 and 37 by presenting a short circuit to the inductive field when the circuit is not in operation.

Although the timing oscillator 55 has a normal period of approximately two-thirds of one-half cycle of the output frequency, the actual frequency of the timing oscillator varies in proportion to the voltage applied through the amplifier 57. If the output amplitude is lower than the predetermined value, the frequency of the timing oscillator will decrease. Correspondingly, the period of the timing oscillator will increase, thereby providing a longer time interval before multivibrator 21 is reset, and in which either the AND gate 27 or 33 is left open. Leaving the AND gate open a longer than normal period will result in an increase in the time during which current is applied to the output transformer 41.

Although the operation of the timing oscillator is started in each instance by a sync pulse as shown in FIGURE 2*a*, the time as shown at 73 in FIGURE 2*d* can be either increased or decreased as determined by the input to the oscillator itself. It will be noted that the edges 75 and 79 shown in FIGURES 2*g* and 2*h* respectively are in each case determined by the output of the timing oscillator as shown in FIGURE 2*d*. On the other hand, the edges 77 and 81 of the output coincidence gate curves are determined by the output of the sync amplifier 13 as shown in FIGURE 2*a*. It is apparent that by increasing the time, for instance between the edges 75 and 77 of the output of AND gate 27 (FIGURE 2*g*), the amplifier 35 will conduct a greater period of time and consequently will apply a pulse to the output transformer 41 having more energy than normal. Having more energy, the sinusoidal element, inductor 43 and the capacitor 47, will produce a higher amplitude wave.

Figure 3:
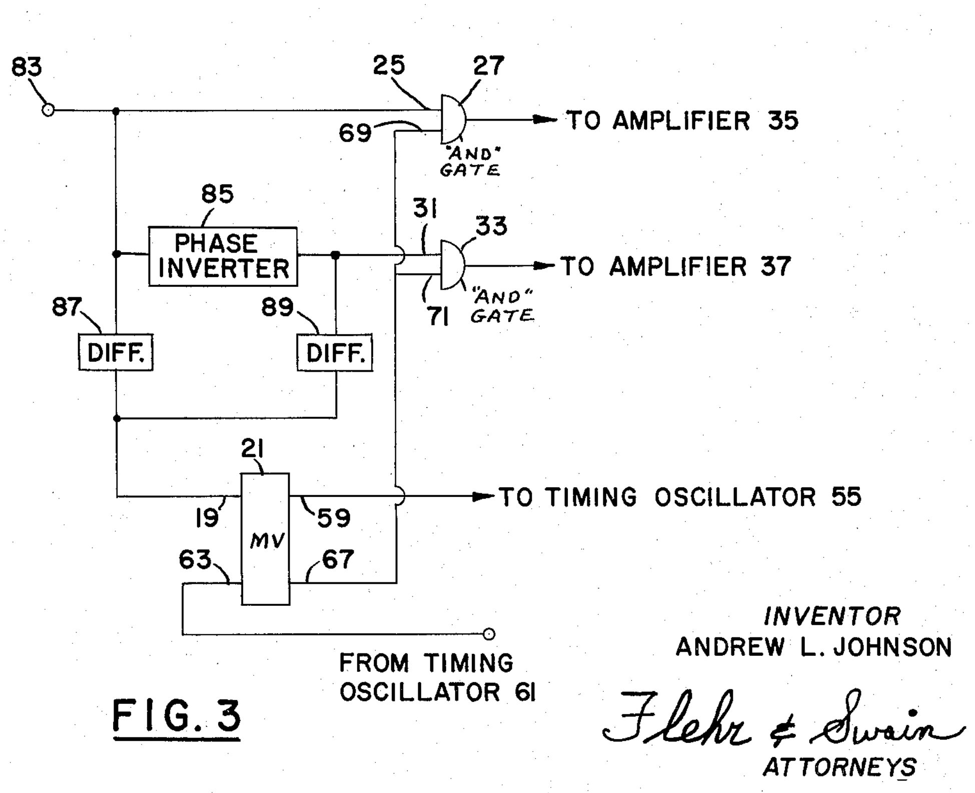
FIGURE 3 is a block diagram of an alternate input for the inverter of this invention.

In FIGURE 3, an alternate input circuit is shown wherein the sync input having a frequency equal to the output frequency is applied to the input terminal 83. The sync input in this case, rather than being a pulse as in the circuit described in FIGURE 1, is a square wave. The square wave sync input is applied directly to the input 25 of the coincidence gate 27. Additionally, it is applied to the input 31 of the coincidence gate 33 through a phase inverter 85. The square wave sync input is also applied through a differentiating circuit 87 to the input 19 of the multivibrator 21. The output of phase inverter 85 is likewise applied to the input 19 of the multivibrator 21 through a differentiating circuit 89. In this embodiment, the use of a phase inverter and a direct connection to the coincidence gate 27 merely takes the place of the multivibrator 17. Since the sync input in this embodiment has a frequency equal to the output frequency (rather than twice the output frequency, as in the embodiment of FIGURE 1), input signal is applied to the multivibrator 21 both at the normal interval directly through the differentiator 87 and at the phase inverter interval through the differentiating circuit 89.

Figure 4:
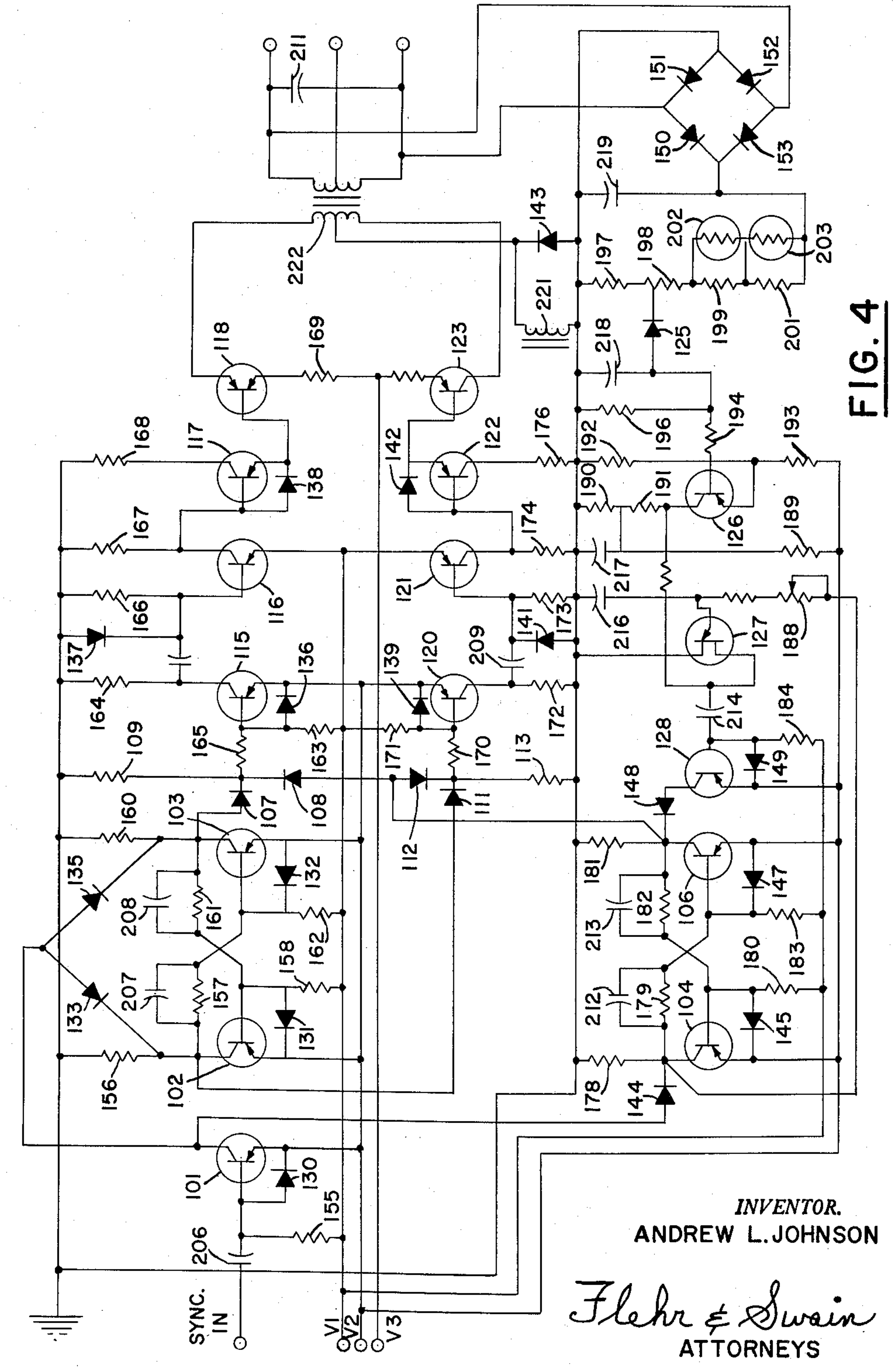
FIGURE 4 is a schematic circuit diagram of a preferred embodiment of the invention.

A specific embodiment of the invention is shown in FIGURE 4 wherein transistor 101 along with its associated circuitry performs the function of the sync amplifier 13. Transistors 102 and 103 along with their circuits perform the function of the multivibrator 17 and transistors 104 and 106 along with their circuits perform the function of multivibrator 21. The AND gate 27 in FIGURE 1 represents the diodes 107 and 108 along with the resistor 109, while the AND gate 33 in FIGURE 1 represents diodes 111 and 112 along with resistor 113. The circuits of the transistors 115, 116, 117 and 118, are represented in FIGURE 1 as the amplifier 35. The circuits of transistors 120, 121, 122 and 123 of FIGURE 4 are represented in FIGURE 1 as the amplifier 37. The voltage reference 53 in FIGURE 1 is shown as diode 125 in FIGURE 4, along with its associated circuitry. The amplifier 57 of FIGURE 1 is shown as the circuit of transistor 126 in FIGURE 4. Transistor 127 along with its associated circuitry is the timing oscillator 55 of FIGURE 1. The circuit of transistor 128 is comparable to the amplifier 65 in FIGURE 1.

The circuit shown in FIGURE 4 was constructed and tested with the following components and valves:

*Voltages*

$V_1$—+28 VDC
$V_2$—+24 VDC, regulated
$V_3$—+24 VDC, unregulated

*Transistors*

| | |
|---|---|
| 101—2N-597 | 118—2N-174 |
| 102—2N-597 | 120—2N-597 |
| 103—2N-597 | 121—2N-597 |
| 104—2N-597 | 122—2N-553 |
| 106—2N-597 | 123—2N-174 |
| 115—2N-597 | 126—2N-332 |
| 116—2N-597 | 127—2N-491 |
| 117—2N-553 | 128—2N-597 |

*Diodes*

| | |
|---|---|
| 107—1N-461 | 112—1N-461 |
| 108—1N-461 | 125—1N-1811 (Zener) |
| 111—1N-461 | 130—1N-461 |

| | |
|---|---|
| 131—1N-461 | 143—15Q4 |
| 132—1N-461 | 144—1N-461 |
| 133—1N-461 | 145—1N-461 |
| 135—1N-461 | 147—1N-461 |
| 136—1N-461 | 148—1N-461 |
| 137—1N-461 | 149—1N-461 |
| 138—10N1 | 150—10N1 |
| 139—1N-461 | 151—10N1 |
| 141—1N-461 | 152—10N1 |
| 142—10N1 | 153—10N1 |

*Resistors*

| | |
|---|---|
| 109—10K ohms | 180—10K ohms |
| 113—10K ohms | 181—2200 ohms |
| 155—10K ohms | 182—18K ohms |
| 156—2200 ohms | 183—10K ohms |
| 157—18K ohms | 184—10K ohms |
| 158—10K ohms | 186—470 ohms |
| 160—2200 ohms | 187—270K ohms |
| 161—18K ohms | 188—50K ohms (potentiometer) |
| 162—10K ohms | 189—750 ohms |
| 163—10K ohms | 190—1200 ohms |
| 164—2200 ohms | 191—470 ohms |
| 165—10K ohms | 192—100 ohms |
| 166—6800 ohms | 193—2200 ohms |
| 167—470 ohms | 194—2200 ohms |
| 168—30 ohms | 196—500 ohms |
| 169—0.1 ohm | 197—22 ohms |
| 170—10K ohms | 198—5000 ohms (potentiometer) |
| 171—10K ohms | 199—2300 ohms |
| 172—2200 ohms | 201—1400 ohms |
| 173—6800 ohms | 202—15K ohms at 25° C. |
| 174—470 ohms | 203—50K ohms at 25° C. |
| 176—30 ohms | |
| 178—2200 ohms | |
| 179—18K ohms | |

*Capacitors*

| | |
|---|---|
| 206—200 mmf. | 213—470 mmf. |
| 207—470 mmf. | 214—.047 microfarad |
| 208—470 mmf. | 216—.01 microfarad |
| 209—2.2 microfarads | 217—15 microfarads |
| 211—5 microfarads | 218—500 microfarads |
| 212—470 mmf. | 219—10 microfarads |

*Inductors*

221—1 mh.

*Transformer*

222—Turns ratio 1–3.78; primary bifilor wound with secondary completely wound between inner and outer halves of primary.

The circuit operated with an A.-C. voltage regulation of $\pm 0.4\%$ with a variation of D.-C. input voltage of $\pm 5\%$.

It should be noted that the above described circuit is but one embodiment of this invention. It is apparent, for instance, that other types of bistable devices such as rectangular hysteresis loop magnetic cores or ceramic capacitances can be used to replace the multivibrators 17 and 21. Also, rather than the phase inverter 85 as shown in FIGURE 3, a delay circuit providing a delay of one-half cycle of output frequency could be utilized in the input to one of the bistable devices.

I claim:

1. An inverter for providing a regulated alternating current to a utilization load comprising first and second coincidence gates, means for applying a direct current coupled to said gates, means for applying pulses to said first gate at a frequency equal to a predetermined output frequency and to said second gate at a delay equal to one-half cycle of said output frequency, a sinusoidal circuit means coupled to the output of said gates, rectifying means coupled between said sinusoidal circuit means and said utilization load, a pulse generator coupled to said rectifying means, said pulse generator being frequency responsive to input amplitude, a bistable device having a set and a reset state, means for applying set pulses to said device in time coincidence to pulses at said first gate, and said pulse generator being coupled to reset said device, one output of said bistable device being coupled to both of said gates.

2. An amplitude regulated inverter as described in claim 1 wherein said means for applying pulses to said first gate at a frequency equal to a predetermined output frequency and to said second gate at a delay equal to one-half cycle of said output frequency comprises a phase inverter.

3. An amplitude regulated inverter as described in claim 1 wherein said pulse generator is a unijunction transistor oscillator.

4. An amplitude regulated inverter for providing a regulated alternating current to a utilization load comprising a first and second bistable device, means for applying a direct current coupled to said first and second device, a first and a second coincidence gate, one output of said first device being coupled to an input to each of said gates, one output of said second device being coupled to an input of both said gates, sync pulse input means coupled to both said devices, the outputs of said gates being coupled in push-pull to a sinusoidal circuit, rectifying means coupled to between said sinusoidal circuit and said utilization load, a pulse generator coupled to the output of said rectifying means, said pulse generator being frequency responsive to input amplitude, the output of said pulse generator being coupled to a second input of said second bistable device.

5. An amplitude regulated inverter as described in claim 4 wherein said bistable devices are multivibrators.

6. An amplitude regulated inverter as described in claim 5 wherein said first bistable device is a multivibrator having a single input.

7. An amplitude regulated inverter as described in claim 4 wherein said pulse generator is a unijunction transistor oscillator.

8. An inverter for providing a regulated alternating current to a utilization load comprising first and second coincidence gates, means for applying a direct current coupled to said gates, means for applying pulses having a predetermined frequency to said first gate, means for applying delayed pulses at said predetermined frequency to said second gate, said delay corresponding to one-half cycle of said predetermined frequency, output means coupled to said coincidence gates and serving to form an output signal having a frequency dependent upon the predetermined frequency, a pulse generator coupled to said output adapted to generate pulses having a frequency dependent upon the amplitude of the output signal, and means coupled to said generator responsive to said pulses generated by said generator for controlling the coincidence gates.

9. An inverter for providing a regulated alternating current to a utilization load comprising means for generating first and second gating pulses, gating means coupled to the output of said generating means for producing an alternating current signal in response to said pulses, means for applying a direct current coupled to the input of said gating means, and means for controlling the frequency of said second gating pulses in accordance with the amplitude of said alternating current signal coupled between the output of said gating means and the input of said gating means whereby the open period of said gating means is varied.

References Cited in the file of this patent

UNITED STATES PATENTS

| | | |
|---|---|---|
| 2,920,283 | Cole et al. | Jan. 5, 1960 |
| 2,950,461 | Tryon | Aug. 23, 1960 |